Patented Oct. 17, 1944

2,360,393

UNITED STATES PATENT OFFICE 2,360,393

ALCOHOLYSIS CATALYSTS

Harry Burrell, Clifton, N. J., assignor, by mesne assignments, to Heyden Chemical Corporation, New York, N. Y., a corporation of Delaware No Drawing. Application March 10, 1941,
Serial No. 382,586

14 Claims. (Cl. 260—410.6)

This invention relates to substances promoting the alcoholysis of esters by alcohols, and especially by pentaerythritol or by polypentaerythritols.

By "polypentaerythritols" I mean those compounds of higher molecular weight than pentaerythritol which are formed either actually or theoretically by etherifying one or more of the hydroxyl groups of pentaerythritol with a polyhydric alcohol. These polypentaerythritols therefore have either the same number of hydroxyl groups as pentaerythritol (as for instance when an ether is formed between pentaerythritol and a glycol or with pentaerythritol and ethylene oxide); or the polypentaerythritols may have a greater number of hydroxyl groups than pentaerythritol, that is to say five or more (as for instance when an ether is formed between two or more molecules of pentaerythritol, or with pentaerythritol and glycerol, etc.). Technical pentaerythritol as now made is a mixture composed primarily of pentaerythritol with some polypentaerythritols, such as dipentaerythritol.

It is an object of this invention to replace part of the alcohol residues in esters by pentaerythritol or polypentaerythritol groups. It is a further object to alcoholize naturally occurring esters such as fatty acid glycerides. It is still another object to prepare hydroxylated partial esters suitable for further reaction, for example with dibasic acids for the preparation of alkyd resins or for further reaction with monobasic acids such as fatty acids in order to prepare fatty oils, especially the drying oils.

It is known that oxides and hydroxides as well as some alcoholates of alkali metals and the alkaline earth metals will promote alcoholysis. Lead oxide or litharge has also been frequently used. These substances are not satisfactory for many uses. The alkali metal oxides form soaps which are deleterious to the weathering properties and to the clarity of alkyd resins and drying oils prepared with their aid. The alkaline earth metal compounds cause excessive foaming during the alcoholysis reaction and are frequently too insoluble to be effective. Litharge promotes the formation of color bodies and in the amounts required for alcoholysis causes an undesirable siccative action. This is especially true in the case of pentaerythritol esters of drying oils where the use of lead oxide leads to the formation of brittle films and also causes excessive darkening of the pentaerythritol drying oils, thereby limiting their use in light colored paints and varnishes.

It has now been found that calcium naphthenate promotes the alcoholysis of esters particularly glycerides by pentaerythritol or polypentaerythritols. When calcium naphthenate is used as the alcoholysis catalyst, the color of the resultant product is very much lighter than that obtained when lead oxide is used and in fact is even lighter than the product made without the aid of any catalyst whatsoever. Calcium naphthenate has the added advantage of being soluble in many natural glyceride oils and, in general, has been found to be a very satisfactory alcoholysis catalyst. When the alcoholized products resulting from such catalysis are used in alkyd resins or drying oils, the calcium naphthenate adds body and also has a slight siccative action.

The method of using this catalyst consists in heating the pentaerythritol or polypentaerythritol with the ester which it is desired to alcoholize in the presence of calcium naphthenate until the pentaerythritol has reacted. In the case of drying or semi-drying oils, this heating procedure can be conveniently carried out simply by heating to approximately 250° C. and immediately cooling. In some cases, it is desirable to maintain the temperature at from 180° C. to 280° C. until the alcohol has completely reacted with the ester. The amount of calcium naphthenate added to promote alcoholysis may be varied from 1% to 5% based on the weight of ester used, and 2% calcium napthenate may be considered a frequently desirable amount. In certain cases, especially where high temperatures are used, it is advisable to conduct the alcoholysis reaction under an inert atmosphere and this may be conveniently accomplished by passing a stream of carbon dioxide or nitrogen through the reaction mixture.

The products of the alcoholysis consist of mixed esters which contain free hydroxyl groups in the molecule which are capable of further reaction. Thus this procedure provides a convenient method of preparing preliminary reaction products which may be converted into alkyd resins by further reacting with dibasic acids such as phthalic anhydride, maleic anhydride, fumaric acid, succinic acid and the like. Again the reaction products are useful in preparing mixed glycerol-pentaerythritol fatty acid esters since the alcoholysis products can be further reacted with monobasic carboxylic fatty acids.

The following examples are given for illustrative purposes only and should not be construed so as to limit the invention as to proportions or scope. Parts are by weight.

*Example 1.*—150 parts alkali-refined soy bean oil, 3 parts calcium naphthenate, and 37.5 parts technical pentaerythritol were heated together in an apparatus fitted for stirring the reactants under an inert atmosphere. The ingredients were heated from room temperature up to 250° C. in 31 minutes, at which time the pentaerythritol had substantially completely reacted. The reaction product was immediately cooled to 128° C. when it was further reacted with 73 parts of phthalic anhydride at 250° C. for 3.75 hours. The product was an alkyd resin which had a Gardner color of 7 when dissolved in an equal weight of toluol.

*Example 2.*—150 parts of alkali-refined soy bean oil and 37.5 parts technical pentaerythritol were heated in the absence of calcium naphthenate to 280° C. at which temperature the pentaerythritol had not yet reacted. Some of the pentaerythritol had sublimed on the upper walls of the reaction vessel, some had melted and formed a liquid layer at the bottom, and a small amount had dispersed to form a cloudy suspension in the hot oil. It was necessary to continue heating at 275° C. to 280° C. for 31 minutes with vigorous agitation before the pentaerythritol had reacted.

This product was also made into an alkyd resin following the same procedure as in Example 1 and the resultant resin had a Gardner color of 9 when dissolved in an equal weight of toluol.

*Example 3.*—150 parts of alkali-refined soy bean oil, 37.5 parts technical pentaerythritol and 0.38 part litharge were heated under an inert atmosphere to 250° C. in 36 minutes. At this point the pentaerythritol had reacted but the resulting alcoholized soy bean oil was extremely dark colored. The product was cooled and reacted with phthalic anhydride as in Example 1. The resultant alkyd resin had a Gardner color of 11 when dissolved in an equal weight of toluol.

*Example 4.*—The procedure of Example 1 was repeated replacing the calcium naphthenate with 0.15 part calcium oxide. In this case, it was impossible to conduct the alcoholysis reaction because excessive foaming carried the reactants out of the reaction vessel.

*Example 5.*—150 parts soy bean oil, 37.5 parts pentaerythritol, and 1.5 parts calcium naphthenate were heated to 265° C. in 34 minutes at which point the pentaerythritol had reacted. When the reaction product was converted into an alkyd resin by reacting with 73 parts phthalic anhydride, a 50% solution in toluol had a Gardner color of 9.

*Example 6.*—150 parts of alkali-refined soy bean oil, 15 parts purified dipentaerythritol, 3.0 parts calcium naphthenate and 32 parts high flash petroleum naphtha were heated to 246° C. in 39 minutes. The temperature was then lowered to 92° C. and 100 parts of linseed oil fatty acids were added. The reaction mixture was further heated at 260° C. for 2 hours allowing the high flash naphtha to distill off and carry with it by azeotropic distillation the water which was separated in a trap and drawn off while the high flash naphtha was returned to the reaction mixture. When substantially the theoretical amount of water had distilled off, the temperature of the reaction mixture was raised to 310° C. to distill off the high flash naphtha. The product was a light brown viscous oil consisting of mixed soy bean oil fatty acid and linseed oil fatty acid esters of glycerol and dipentaerythritol.

*Example 7.*—150 parts "non-break" linseed oil, 3.0 parts calcium naphthenate, 6.0 parts purified pentaerythritol and 32 parts high flash petroleum naphtha were heated to 250° C. in 25 minutes in which time the pentaerythritol had substantially completely reacted. The product was cooled slightly and 50 parts of unsaturated fish oil acids (obtained by fractional distillation) were added. The reaction mixture was further heated at 220° C. to 230° C. to yield a reddish brown viscous drying oil.

It may readily be seen from the examples that the alcoholysis by pentaerythritol is greatly aided by using catalytic amounts of calcium naphthenate and by so doing the deleterious effects of lead oxide, or of other caustic oxides, are avoided.

Having thus described my invention, what I claim as new and desire to secure by Letters Patent is:

1. The process of alcoholizing a fatty acid ester of glycerol with an alcohol selected from the group consisting of pentaerythritol, polypentaerythritols, and mixtures thereof, which consists in reacting them in the presence of calcium naphthenate as a catalyst.

2. A process which includes heating together a fatty acid ester of glycerol with an alcohol selected from the group consisting of pentaerythritol, polypentaerythritols, and mixtures thereof, in the presence of calcium naphthenate as a catalyst.

3. The process of alcoholizing soy bean oil with a mixture of pentaerythritol and a polypentaerythritol, which includes reacting them in the presence of calcium naphthenate as a catalyst.

4. The process of alcoholizing linseed oil with a mixture of pentaerythritol and a polypentaerythritol which includes reacting them in the presence of calcium naphthenate as a catalyst.

5. The process of alcoholizing a drying oil with a mixture of pentaerythritol and a polypentaerythritol which includes reacting them in the presence of calcium naphthenate as a catalyst.

6. The process of alcoholizing a drying oil with an alcohol selected from the group consisting of pentaerythritol, polypentaerythritols, and mixtures thereof, which consists in reacting them in the presence of calcium naphthenate as a catalyst.

7. A process which includes heating together an unsaturated fatty acid ester of glycerol with an alcohol selected from the group consisting of pentaerythritol, polypentaerythritols, and mixtures thereof, in the presence of calcium naphthenate as a catalyst, to thereby effect alcoholysis.

8. A process which includes heating together a drying oil with an alcohol selected from the group consisting of pentaerythritol, polypentaerythritols, and mixtures thereof, in the presence of calcium naphthenate as a catalyst.

9. A process which includes heating together a drying oil with pentaerythritol in the presence of calcium naphthenate as a catalyst, to thereby effect alcoholysis.

10. A process which includes heating together a drying oil with a polypentaerythritol in the presence of calcium naphthenate as a catalyst, to thereby effect alcoholysis.

11. The process of alcoholizing a fatty acid ester of glycerol with an alcohol selected from the group consisting of pentaerythritol, polypentaerythritols, and mixtures thereof, which consists in reacting them in the presence of calcium naphthenate as a catalyst.

12. A process which includes alcoholizing a fatty acid ester of glycerol with an alcohol selected from the group consisting of pentaerythritol, polypentaerythritols, and mixtures thereof, in the presence of calcium naphthenate as a catalyst.

13. The process of alcoholizing soy bean oil with a mixture of pentaerythritol, polypentaerythritol, and mixtures thereof, which includes reacting them in the presence of calcium naphthenate as a catalyst.

14. A mixture of hydroxylated, partial, fatty acid esters of glycerol and an alcohol selected from the group consisting of pentaerythritol, polypentaerythritols and mixtures thereof, together with calcium naphthenate.

HARRY BURRELL.